United States Patent [19]

Bouvot

[11] Patent Number: 4,757,744

[45] Date of Patent: Jul. 19, 1988

[54] APPARATUS FOR CONTROLLING FLAPS IN AN INSTALLATION FOR HEATING AND VENTILATING OR FOR AIR-CONDITIONING A MOTOR VEHICLE

[75] Inventor: Jean-Francois Bouvot, Dampierre, France

[73] Assignee: Valeo, Paris, France

[21] Appl. No.: 807,872

[22] Filed: Dec. 11, 1985

[30] Foreign Application Priority Data

Dec. 20, 1984 [FR] France ................... 84 19579

[51] Int. Cl.$^4$ .............................................. F01L 15/00
[52] U.S. Cl. .................... 91/189 A; 91/189 R; 91/404; 137/625.48
[58] Field of Search ............ 91/189 A, 404, 189 R; 137/625.48

[56] References Cited

U.S. PATENT DOCUMENTS

| | | | |
|---|---|---|---|
| 3,657,965 | 4/1972 | Kirk | 91/189 |
| 3,669,137 | 6/1972 | Kirk | 91/189 |
| 4,188,976 | 2/1980 | Austin, Jr. | 91/189 A |
| 4,448,390 | 5/1984 | Halstead et al. | 251/176 |
| 4,478,129 | 10/1984 | Hannes | 91/189 R |
| 4,580,758 | 4/1986 | Bouvot | 137/625.48 |
| 4,588,953 | 5/1986 | Krage | 91/189 R |
| 4,637,294 | 1/1987 | Huet | 91/189 R |

FOREIGN PATENT DOCUMENTS

| | | |
|---|---|---|
| 0053462 | 6/1982 | European Pat. Off. . |
| 0125976 | 11/1984 | European Pat. Off. . |
| 2220727 | 10/1974 | France . |
| 2491839 | 4/1982 | France . |
| 2100417 | 12/1982 | United Kingdom . |

Primary Examiner—Abraham Hershkovitz
Attorney, Agent, or Firm—Dennison, Meserole, Pollack & Scheiner

[57] ABSTRACT

Apparatus for controlling a plurality of moving members, e.g. the flaps in an installation for heating and ventilating or for air conditioning a motor vehicle, comprises single-acting actuators (46, 48) whose piston rods (50, 52) are connected to rotate the flaps about their respective axes (12, 14), with the actuators (46, 48) being fed from a pressurized fluid distributor (32) which includes moving elements which are respectively connected to control means and to each of the piston rods (50, 52), together with fluid flow servo control means for putting the displacement of one flap under the control of the displacement of another flap.

13 Claims, 10 Drawing Sheets

APPARATUS FOR CONTROLLING FLAPS IN AN INSTALLATION FOR HEATING AND VENTILATING OR FOR AIR-CONDITIONING A MOTOR VEHICLE

FIELD OF THE INVENTION

The invention relates to apparatus for controlling moving members, such as the flaps, for example, in an installation for heating and for ventilating or for air conditioning the cabin of a motor vehicle, the apparatus being of the type which comprises single-action actuators whose piston rods are connected to the moving members in order to displace them through predetermined positions, said actuators being supplied with driving fluid from a distributor which connects them to a source of fluid under pressure and to an exhaust, said distributor being itself controlled by control means which may be provided, for example, on the vehicle dashboard in order to be operated by the driver or the front passenger.

BACKGROUND OF THE INVENTION

It is preferable to use fluid flow control devices rather than using conventional mechanical type controls relying on an arrangement of levers and cables, since fluid flow devices provide easier and smoother control. In addition, in the event that a source of reduced pressure breaks down or stops, the moving members may be automatically returned to a privileged or safety position by return springs acting on the displacement actuators. However, fluid flow control devices have only been used heretofore for displacing a single flap at a time, or in the limit, two flaps when said flaps are displacable along trajectories which do not cross each other.

However, installations for heating and ventilating or for air conditioning vehicles do exist which comprise a variety of flaps that are rotatably mounted about parallel axes and that are actuated by a single control device in order to be displaced through predetermined positions, which displacements may be synchronized or not, depending on circumstances, with the flaps being generally intended to mix and distribute flows of hot air and cold air passing through the installation. Since the flaps are relatively close to one another, their trajectories may intersect. It is thus possible, in such an installation, for it to be impossible to move two flaps simultaneously since one of the flaps may need to be moved before the other flap is moved in order to prevent said flaps from abutting against each other and jamming or otherwise interfering with the intended motions.

The relatively complex problems which are encountered when controlling the flaps in an installation of this type have been solved heretofore by mechanical means including cam arrangements, which further increase the force which the user must apply to the control means, at least in some positions thereof which correspond to awkward functions in the installation, and this can even lead to the flaps becoming jammed in some conditions of vehicle use, for example when the vehicle is travelling at very high speed and the flaps are in positions for closing outlet orifices from the housings in which they are located.

Preferred implementations of the present invention provide fluid flow apparatus for controlling moving members, such as the flaps of an installation for heating and ventilating or for air conditioning a motor vehicle, which apparatus avoids the drawbacks of mechanical apparatus for performing the same purpose and is applicable to any multi-flap installation regardless of whether the flap trajectories intersect or not.

SUMMARY OF THE INVENTION

The present invention provides apparatus for controlling moving members such as flaps in an installation for heating and ventilating or for air conditioning the cabin of a motor vehicle, the apparatus including all-or-nothing type actuators having piston rods connected to said moving members, a pressurized fluid distributor connected firstly to feed orifices of said actuators and secondly to a source of fluid under pressure and to an exhaust, and distributor control means disposed, for example, on the vehicle dashboard and capable of occupying a plurality of fixed states or positions which correspond to predetermined positions of the moving members, the apparatus including the improvement of fluid flow servo control means for bringing the displacement of at least one moving member under the control of the displacement of at least one other moving member, said means being suitable for detecting the presence or the absence of a moving member in a predetermined position in order to enable or to inhibit the displacement of another moving member as a function of said detected presence or absence.

Thus, control apparatus in accordance with the present invention enables a single user-controlled control means to successively displace, where appropriate, first one moving member and then another moving member in such a manner that the first moving member arrives in a predetermined position before the second moving member begins its own displacement towards its own predetermined position, with the order in which the moving members are displaced being chosen in such a manner that they do not collide with one another during their displacements, and they do not jam one another.

Preferably, said fluid flow servo control means are integrated in the said distributor, and comprise chambers formed in the distributor with each chamber being suitable firstly for being connected to the fluid feed orifice of the actuator of a corresponding moving member when the control means is in one fixed state or position and to be isolated therefrom when the control means is in another state or position, and secondly for being connected to the exhaust or to the source of fluid under pressure by means associated with another moving member solely when said other moving member is in a predetermined position and to be isolated therefrom when said other moving member is in another position.

Thus, the presence or absence of one moving member controls whether the actuator of another moving member is connected to or is isolated from a source of fluid under pressure or an exhaust as the case may be. This guaranteees that the other moving member does not move until the first moving member has arrived in its predetermined position which is chosen so that it does not get in the way of the other moving member when it moves, and so that its own movement is not hindered or prevented by the movement of the other moving member.

Further, control apparatus in accordance with the invention with the servo control means integrated in the pressurized fluid distributor can be made in a particularly compact configuration, thereby facilitating installation in a vehicle and connections to the moving member actuators, to the source of fluid under pressure and to the exhaust.

The above-mentioned chambers which constitute portions of the servo control means may be formed within the distributor between a fixed element thereof and a first moving element which is connected to the manual control means and is displacable thereby to occupy predetermined positions relative to said fixed element.

The distributor further includes a plurality of second moving elements, each of which is connected to the piston rod of an actuator or to the moving member associated with said actuator and is movable thereby through predetermined positions relative to said fixed distributor elements, with the fixed distributor elements including fluid passages for establishing communication between chambers formed with the first moving element and chambers formed with the second moving elements, as a function of the positions of the moving elements relative to the fixed element.

The chambers formed between the fixed element and the first moving element connected to the control means include at least: a chamber connected to the source of fluid under pressure; the chamber connected to the exhaust; an isolated chamber; and the above-mentioned chambers which constitute a portion of the servo control means and which are suitable for being connected to the source of fluid under pressure or to the exhaust and for being isolated therefrom as a function of the positions of the moving members.

The chambers formed between the fixed distributor element and each of the second moving elements connected to the moving members or to the piston rods of the associated actuators comprise as many chambers as there are positions which may be occupied by each second moving element relative to the fixed element, and at least one additional chamber for detecting the presence of a moving element in a predetermined position relative to the fixed element.

The additional chamber is connected to the source of fluid under pressure or to the exhaust by a fluid passage formed through the moving member when the moving member is in said predetermined position, and is isolated therefrom when the moving member is in another position. Furthermore, each second moving element of the distributor is connected to the supply orifice of the associated actuator by a fluid duct whose end opens out into one or other of the chambers formed by the moving element in conjunction with the fixed element.

The fixed element includes as many fluid passages per second moving element as there are chambers between the fixed element and said second moving element, each of said chambers being permanently connected by one of said fluid passages to a chamber formed between the fixed element and the first moving element of the distributor.

A pressurized fluid distributor in accordance with the invention thus enables a single control to displace a plurality of moving members with the order in which the members are moved being automatically selected so as to prevent the members from jamming one another.

The force which needs to be applied to the control means is constant and quite independent of the forces required to displace the moving members.

BRIEF DESCRIPTION OF THE DRAWINGS

An embodiment of the invention is described by way of example with reference to the accompanying drawings, in which.

MORE DETAILED DESCRIPTION

Figure 1:
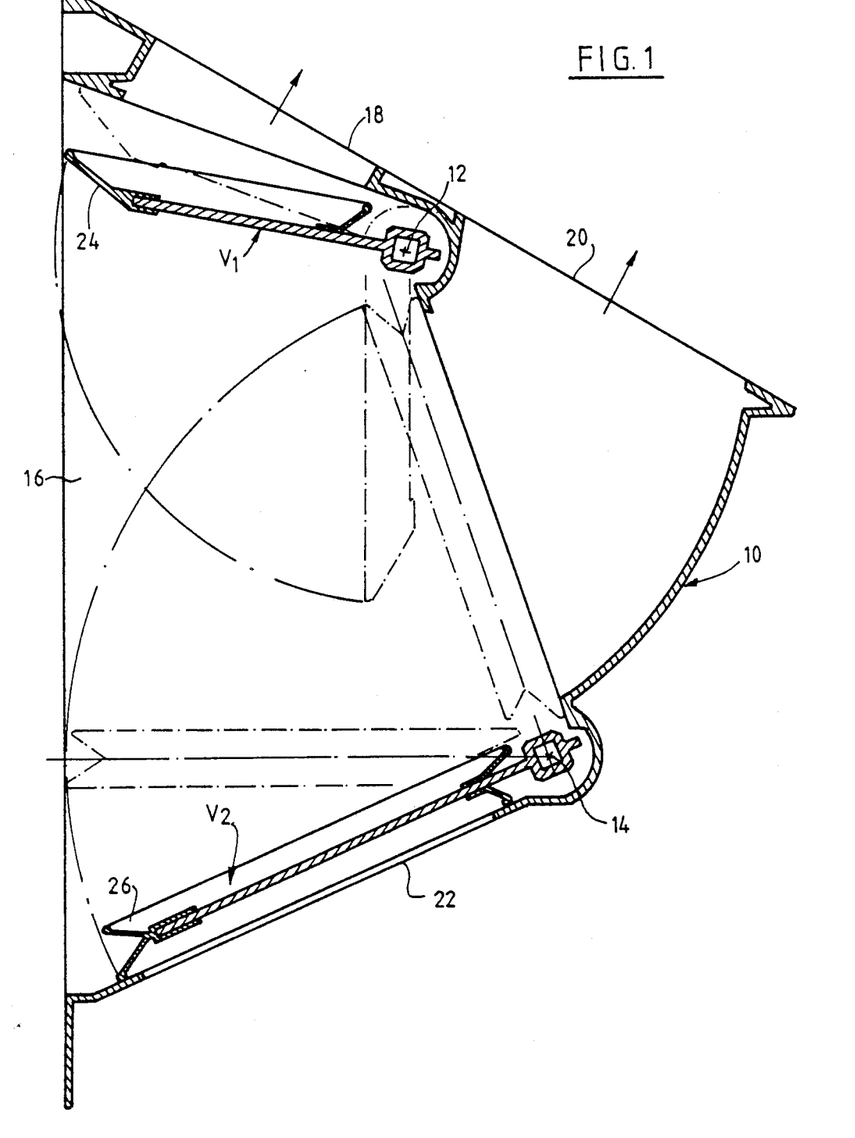
FIG. 1 is a diagrammatic section through a portion of an installation for heating and ventilating or for air conditioning the cabin of a motor vehicle, said installation including two rotary flaps.

Reference is made initially to FIG. 1 which shows an installation for heating and ventilating or for air conditioning the cabin of a motor vehicle.

This installation comprises a fixed housing 10 which is equipped with two flaps V1 and V2 which are rotatably mounted about parallel axes 12 and 14, and each of which is capable of occupying three distinct predetermined positions.

The housing 10 includes an inlet passage 16 for hot air, cold air, or air at an intermediate temperature, and three main outlet orifices respectively designated by the references 18, 20 and 22. The flap V1 is fitted with a sealing gasket 24 and may occupy three predetermined angular positions about its axis of rotation 12. In its first position, the flap V1 closes the outlet orifice 18 in a sealed manner. In its second position, which is the position in solid lines in FIG. 1, the flap V1 is moved a short distance away from the outlet orifice 18. In its third position, shown in dot dashed lines in FIG. 1, the flap V1 is in a position where it partially closes the outlet orifice 20 from the housing 10.

The flap V2 is likewise fitted with a sealing gasket 26 and is likewise capable of occupying three predetermined angular positions about its axis of rotation 14. In its first position, it closes the outlet orifice 22 in a sealed manner. In its second position, shown in dot dashed lines in FIG. 1, it is located a short distance away from the outlet orifice 22. In its third position, likewise shown in dot dashed lines in FIG. 1, it closes the outlet orifice 20 from the housing 10 in a sealed manner.

Figure 2:
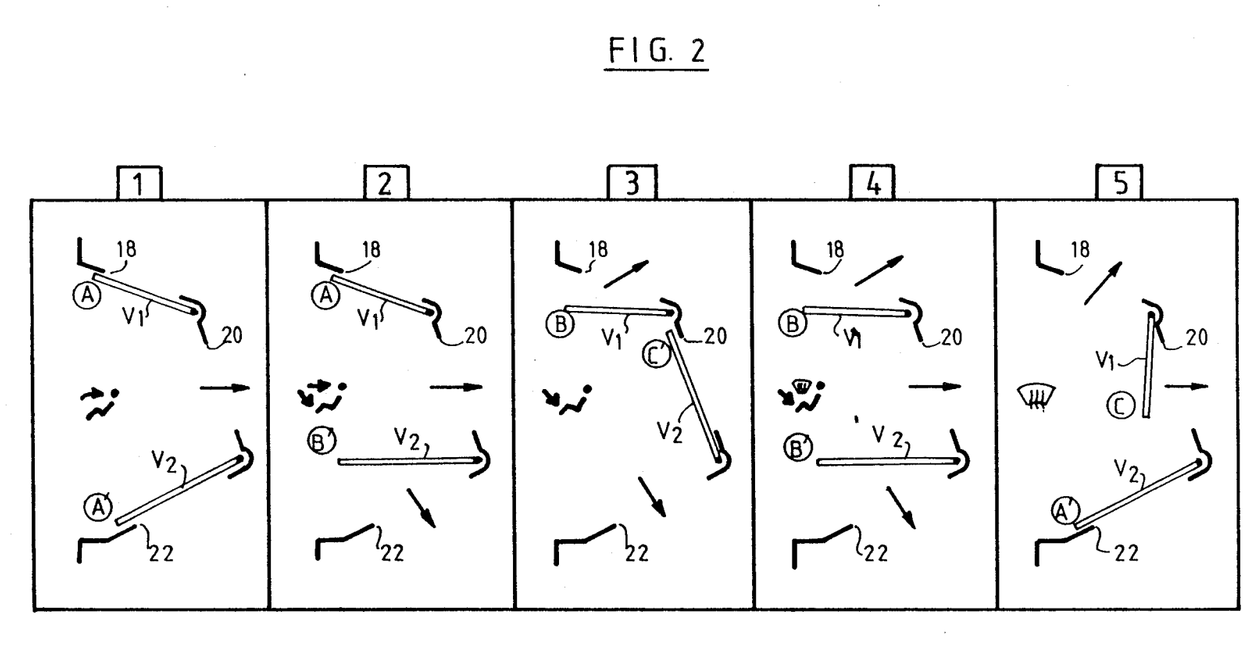
FIG. 2 is a diagram showing the various functions which said flaps can perform depending on their respective angular positions.

Both flaps V1 and V2 are actuated by a single control device capable of occupying five predetermined states or positions which correspond to five of the possible combinations of positions of the flaps V1 and V2 and which are shown diagramatically in FIG. 2.

The control means mounted on the dashboard of the motor vehicle may be of the lever type or it may be a cursor displacable along a rectilinear trajectory.

State No. 1, or the first position of the control means corresponds to the installation providing ventilation, with the flap V1 being in its A position closing the orifice 18 from the housing 10 and the flap V2 being in its A' position closing the lower orifice 22. Any air entering the housing 10 leaves via the middle orifice 20.

State No. 2, or the second position of the control means corresponds to the installation providing ventilation and heating. The flap V1 is still in its A position closing the upper orifice 18, while the flap V2 is in its intermediate B' position between the orifices 20 and 22. The air entering the housing 10 thus leaves via both of the orifices 20 and 22.

State No. 3 or the third position of the control means corresponds to the installation acting as a heater and as a windscreen defroster/demister. Flap V1 is in its intermediate B position and the flap B2 is in its C' position closing the middle orifice 20 from the housing. Air arriving in the housing thus leaves via the upper orifice 18 and via the lower orifice 22.

State No. 4 or the fourth position of the control means corresponds to the following functions: windscreen defrosting/demisting, ventilation and side window demisting, cabin heating. The flap V1 is in its intermediate position B, and the flap V2 is also in its intermediate position B'. Air entering the housing 10 leaves via all three orifices 18, 20, and 22.

State No. 5 or the fifth position of the control means corresponds to windscreen defrosting/demisting together with side window demisting and ventilation. The flap V1 is in its position C where it partially closes the intermediate orifice 20 and the flap V2 is in its position A' where it closes the lower orifice 22. Air entering the housing 10 thus leaves via the orifices 18 and 20.

Figure 3:
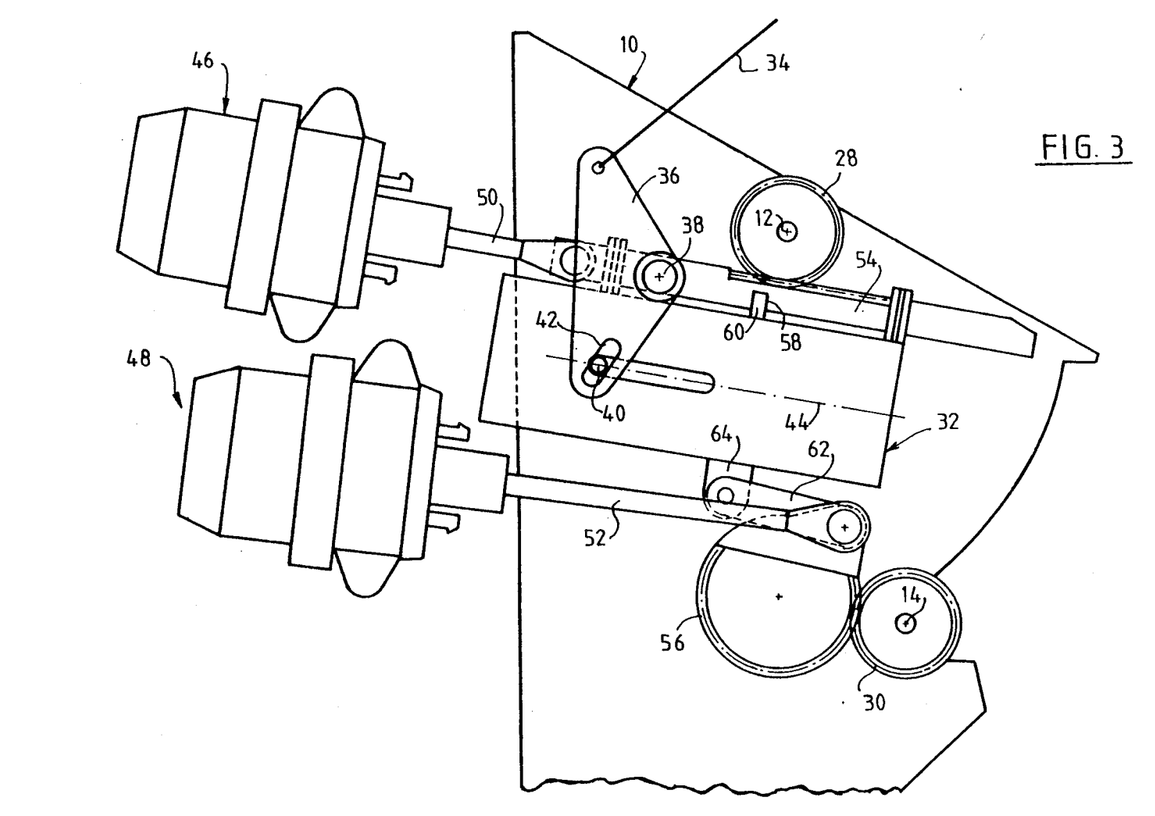
FIG. 3 is an overall view of control apparatus in accordance with the invention.

FIG. 3 is a diagrammatic overall view of the installation shown in FIGS. 1 and 2 together with its fluid flow control apparatus in accordance with the invention.

FIG. 3 shows the FIG. 1 housing 10 seen from the outside, together with the ends of the axes 12 and 14 about which the flaps V1 and V2 rotate, the shafts extending along said axes project out from the housing 10 and are fixed to respective gear wheels 28 and 30.

The control apparatus in accordance with the invention comprises a pressurized fluid distributor given an overall reference 32 and mounted on an outside wall of the housing 10.

The distributor 32 includes a first moving element (not visible in FIG. 3) which is connected to control means provided on a motor vehicle dashboard by means of a control cable 34 and a crank 36 mounted to pivot about a fixed axis 38. The said moving element of the distributor includes, for example, a tubular end piece 40 which is received in a slot 42 in the crank 36 so that when the crank 36 pivots about its fixed axis 38, the tubular end piece 40 on the first moving element of the distributor moves in translation along an axis 44.

The distributor 32 further includes two second moving elements which are associated with the flaps V1 and V2 respectively.

Each flap V1 or V2 is rotated about its axis 12 or 14 by a corresponding pneumatic actuator 46 or 48 having a fixed cylinder and a moving piston rod 50 or 52 connected to a respective one of the flaps V1 or V2. In the example shown, the piston rod 50 of the actuator 46 is connected to the flap V1 by a rectilinear rack 54 which is supported and guided to move in translation along a side face of the distributor 32 and which meshes with the gear wheel 28 mounted on the end of the shaft connected to the flap V1.

The piston rod 52 of the actuator 48 which operates the flap V2 has its free end hinged to the periphery of a gear wheel 56 which meshes with the gear wheel 30 mounted on the end of the shaft of the flap V2.

The rack 54 associated with the actuator 46 for displacing the flap V1 includes a side notch 58 which receives a finger 60 projecting from that one of the second moving elements of the distributor which is associated with the flap V1. The piston rod 52 of the actuator 48 for displacing the flap V2 is connected via a link 62 to a laterally-projecting finger 64 on that one of the second moving elements of the distributor which is associated with the flap V2.

As is explained below, the second moving elements of the distributor are connected via respective fluid ducts to the feed orifices of the actuators 46 and 48 in order to supply them with fluid under pressure or to connect them to the exhaust.

It can be seen in FIG. 3 that when the piston rod 50 of the actuator 46 is fully retracted into its cylinder, the flap V1 is moved to an end position by clockwise rotation of the gear wheel 28, which end position corresponds to the flap V1 being in position A as shown in FIG. 2. Conversely, and as shown, when the piston rod 50 is fully extended from the actuator 46, the gear wheel 28 is rotated anti-clockwise by the rack 54 and thereby moves the flap V1 into its opposite end position, i.e. the position marked C in FIG. 2.

When the piston rod 52 of the actuator 48 is completely extended from its cylinder, as shown in FIG. 3, it moves the flap V2 into its end position reference A' in FIG. 2 by rotating the gear wheel 56 clockwise and rotating the gear wheel 30 anti-clockwise. When the piston rod 52 is fully retracted into its cylinder, it rotates the gear wheel 56 anti-clockwise and the gear wheel 30 clockwise thus bringing the flap V2 into its opposite end position reference C' in FIG. 2.

Figure 4:
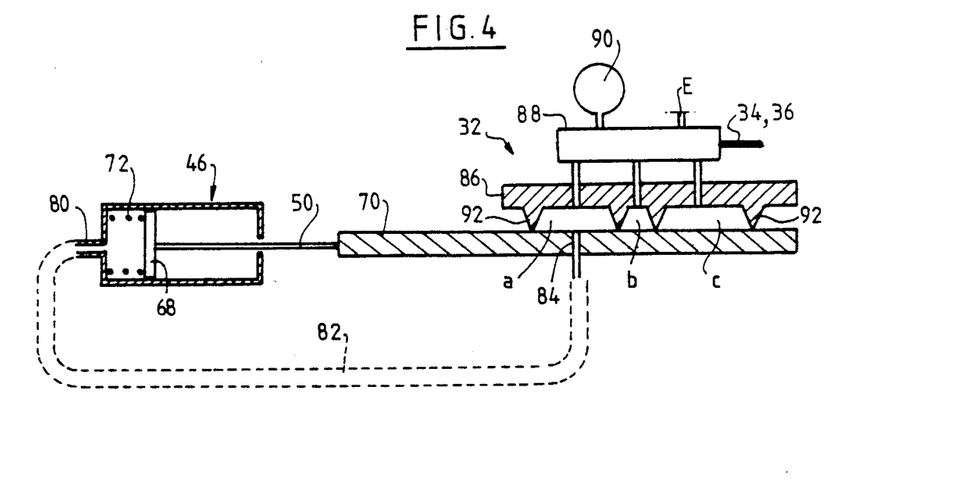
FIG. 4 is a diagrammatic section showing how a moving member is displaced using a single action actuator under the control of a distributor in accordance with the invention.

FIG. 4 is a diagram showing how the above-described apparatus operates, e.g. when controlling flap V1. The actuator 46 is shown in section in FIG. 4 and is a single acting all-or-nothing type actuator comprising a piston 68 connected by the piston rod 50 to one of the second moving elements 70 of the distributor 32. The return spring 72 is interposed between the piston 68 and a bottom plate at the end of the actuator cylinder, which cylinder also includes a feed orifice 80 connected by a duct 82 to a fluid passage 84 through the second moving element 70 of the distributor. The piston rod 50 passes freely through the other end of the cylinder.

The distributor 32 has a fixed element 86 disposed between the said second moving element 70 which is connected to the piston rod 50 of the actuator 46 and a first moving element 88 which is connected to the control means by the cable 34 and the crank 36 shown in FIG. 3, and which is also permanently connected to a source of fluid under pressure 90 and to an exhaust E.

When the installation is an installation for heating and air conditioning a motor vehicle, the source of fluid under pressure is generally a source of reduced pressure with the reduced pressure being taken, for example, from the intake manifold of the vehicle motor and with the exhaust being merely constituted by an orifice giving access to the atmosphere.

The fixed element 86 of the distributor 32 includes sealing ribs or lips 92 which, together with the second moving element 70 delimit three chambers a, b and c disposed so that the fluid passage 84 of said second moving element 70 as connected to the feed orifice 80 of the actuator 47 may open out into any one of said three chambers. Each of these chambers a, b and c may be connected to the source of fluid under pressure 90 or to the exhaust E by the first moving element 88 of the distributor, or else it may be isolated, as a function of the state or position of the control means which is transmitted to the first moving element 88 by the cable 84 and the crank 36.

Figure 5A:
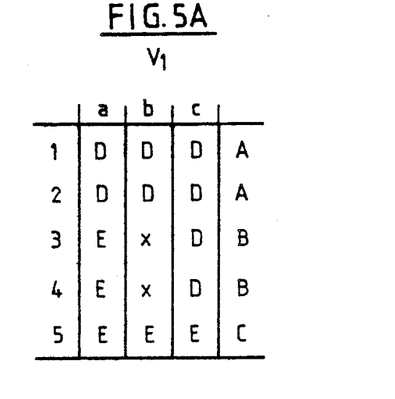
FIGS. 5A and 5B are tables showing the connections to the source of fluid under pressure and to the exhaust of the chambers in a distributor for each position of the moving members.

Table 5A shows how the chambers a, b and c of the distributor are connected to the source of fluid under pressure, to the exhaust, or to neither, as a function of the states or positions 1, 2, 3, 4 or 5 of the control means and the positions a, b, and c which the flap V1 may occupy in the installation, as shown in FIG. 2.

Thus, when the control means are in state or position No. 1 or No. 2, the flap V1 must be in fixed position A, and as can be seen from FIG. 3, this is the position in which the piston rod 50 is fully retracted into the actuator 46, thereby requiring the actuator to be connected to the source of reduced pressure. In order to ensure that the flap V1 remains in its position A under all possible circumstances, it is essential for all three chambers a, b, and c of the distributor to be connected to the source of reduced pressure. This situation is represented by the letter D (for pressure Drop) in the table of FIG. 5A.

When the control means are in state or position No. 3, the flap V1 should be in its intermediate position B to which it can be moved and in which it can be maintained only if chamber a is connected to the exhaust E, the intermediate chamber b is isolated both from the exhaust and from the source of reduced pressure, (which state is represented by the letter X) and the chamber c is connected to the source of reduced pressure.

The same conditions apply for state or position No. 4 of the control means, with the flap V1 remaining in its position B.

For state or position No. 5 of the control means, the flap V1 is in its position C which corresponds to the piston rod 50 being completely extended from the actuator 46. The flap V1 can be brought to this position and maintained therein only if all three chambers a, b, and c are connected to the exhaust E.

Figure 5B:
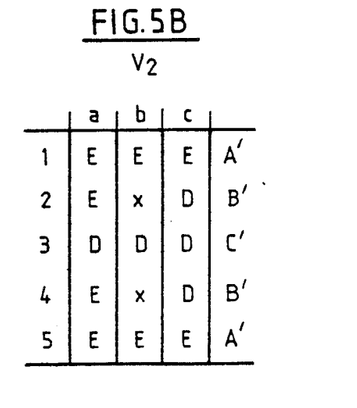

FIG. 5B is a table similar to FIG. 5A but relating to the other flap V2.

In state or position No. 1 of the control means, the flap V2 is in its position A', in which the piston rod 52 is fully extended from actuator 48. The actuator is thus connected to the exhaust and the flap V2 can only be brought to this position or maintained therein provided all three chambers a, b and c are connected to the exhaust.

In position or state No. 2 of the control means, the flap V2 is in its intermediate position B', to which it can only be brought and maintained if the chamber a is connected to the exhaust, the intermediate chamber b is isolated and the chamber c is connected to the source of reduced pressure.

In the state or position No. 3 of the control means, the flap V2 is in its position C' for which the piston rod 52 is fully retracted into actuator 48, thereby requiring all three chambers a, b and c to be connected to the source of reduced pressure D.

In state or position No. 4 of the control means, the flap V2 is again in its intermediate position B', in which the chamber a is connected to the exhaust, the chamber b is isolated, and the chamber c is connected to the source of reduced pressure D.

In position or state No. 5 of the control means, the flap V2 is in its position A', for which all three chambers a, b and c are connected to the exhaust E.

It can be seen from FIG. 2 that if the control means is actuated to pass successively through the positions 1, 2, 3, 4, and 5 or 5, 4, 3, 2, and 1, the flaps V1 and V2 can move without mutually jamming each other. However, if the control means are actuated to pass directly from state No. 3 to state No. 5, it can be seen that the flap V1 can only move from its position B to its position C if the flap V2 has not already been displaced from its position C' to its position A'. Likewise, it is possible to pass directly from state No. 5 to state No. 3 only if the flap V1 is moved first from its position C to its position B prior to the flap V2 being moved from its position A' to its position C'.

The control apparatus in accordance with the invention makes it possible to ensure, under certain conditions, that the flaps V1 and V2 move in the appropriate order. This is now described with reference to FIGS. 6 et seq.

Figure 6:
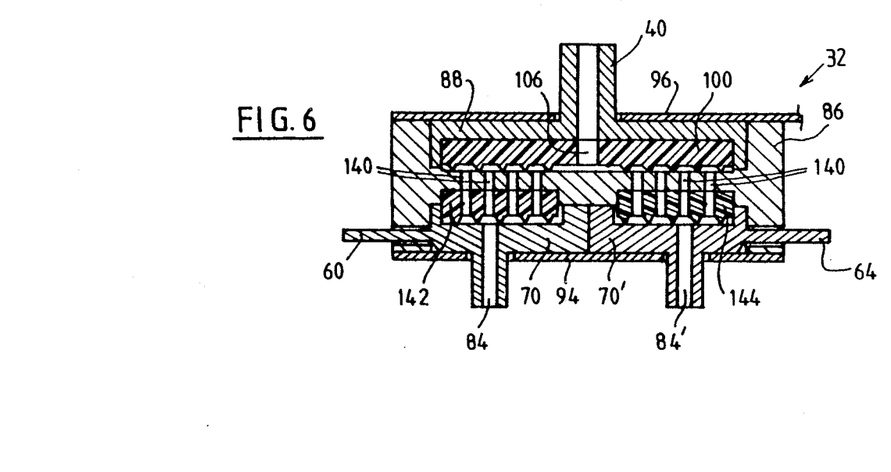
FIG. 6 is a cross section through a fluid distributor in accordance with the invention.
Figure 7:
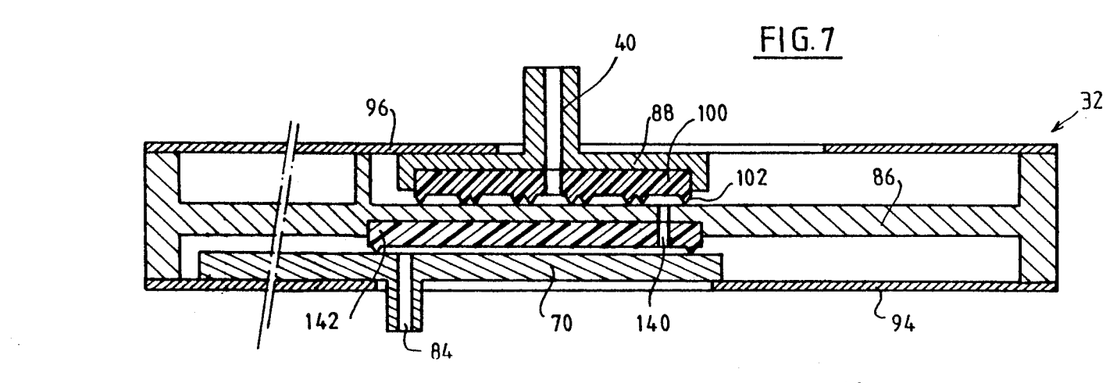
FIG. 7 is a longitudinal section through the same distributor.

The fluid distributor 32 in accordance with the invention as shown in greater detail in FIGS. 6 and 7 comprises, as already described, a first moving element 88 connected to the control means, a fixed element 86, and two second moving elements 70 and 70' connected to the flaps V1 and V2 respectively (or to their actuator piston rods) by means of respective outwardly projecting fingers 60 and 64.

The fixed element 86 has peripheral flanges delimiting housings in which the moving elements 70, 70' and 88 are received, which housings are closed by respective ribs 94 and 96 having longitudinal slots to pass the end fittings 84 and 84' for connection to the feed orifices of the actuators 46 and 48 and to pass the finger 40 on the moving element 88 which is guided along slot 42 in the crank 36 (see FIG. 3).

Figure 8:
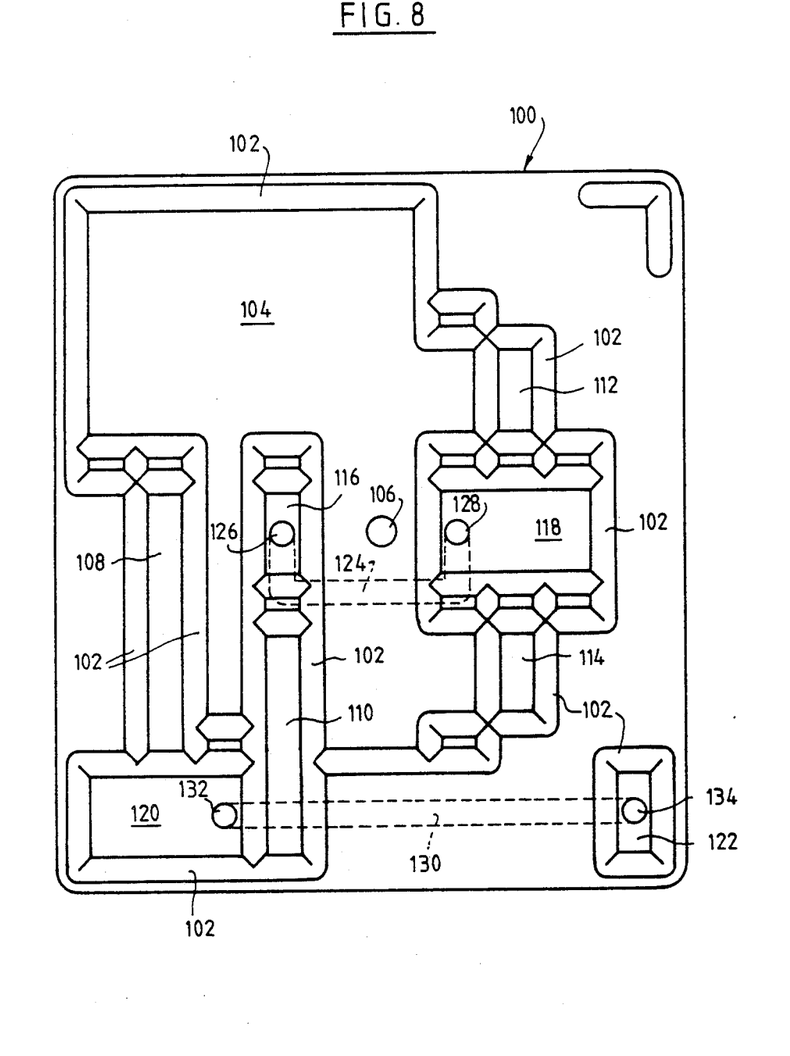
FIG. 8 is a plan view of the inside face of the first moving element of the distributor, which element is connected to the control means.

The moving element 88 of the distributor which is connected to the control means by the cable 34 and the crank 36 is a plate or slider which is guided to move relative to the fixed element 86 in the direction indicated by the axis 44 of FIG. 3, and has a gasket 100 of elastomer or like material on its face which faces the fixed element 86, which gasket is shown in detail in FIG. 8. The gasket 100 constitutes a plane plate whose face facing the fixed element 86 comprises ribs or lips 102 which, together with the fixed element 86 delimit a plurality of chambers. These chambers include, in particular, a chamber 104 into which there opens a hole 106 permanently connecting said chamber 104 to the source of fluid under pressure 90, e.g. via the tubular finger 40 of said first moving element 88, chambers 108, 110, 112 and 114 which are permanently isolated both from the source 90 and from the exhaust, and chambers 116, 118, 120, and 122 which are interconnected in pairs, with the chambers 116 and 118 being connected to each other by a groove 124 in the opposite face of the gasket 100 and via two holes 126 and 128 opening out into said chambers 116 and 118 respectively, and with the chambers 120 and 122 being likewise interconnected by a groove 130 in the opposite face of the gasket 100 and via two holes 132 and 134 opening out into said chambers 120 and 122 respectively.

The chambers 104, 108, 110, 112, 114, 116, 118, 120, and 122 are each completely surrounded by sealing lips or ribs 102. The space lying outside these continuous contours forms a chamber which is directly connected to the exhaust, i.e. a chamber connected to the atmosphere.

The lips 102 are, in fact, constituted by parallel pairs of lips whenever they lie between one chamber which is connected to the exhaust and another chamber which is connected to the source of reduced pressure, thereby preventing these two chambers from being directly interconnected via a hole through an element of the distributor as it passes from one chamber to the other.

The fixed element 86 of the distributor has eight holes 140 passing therethrough, which holes are transversally aligned and disposed in such a manner as to open out into the various chambers formed by the first moving element 88 and its gasket 100. These holes 140 also pass through gaskets 142 and 144 which are fixed on the face of the fixed element 86 which faces away from the first moving element and towards respective ones of the second moving elements 70 and 70′. These gaskets 142 and 144 are shown in greater detail in FIGS. 9 and 10.

Figure 9:
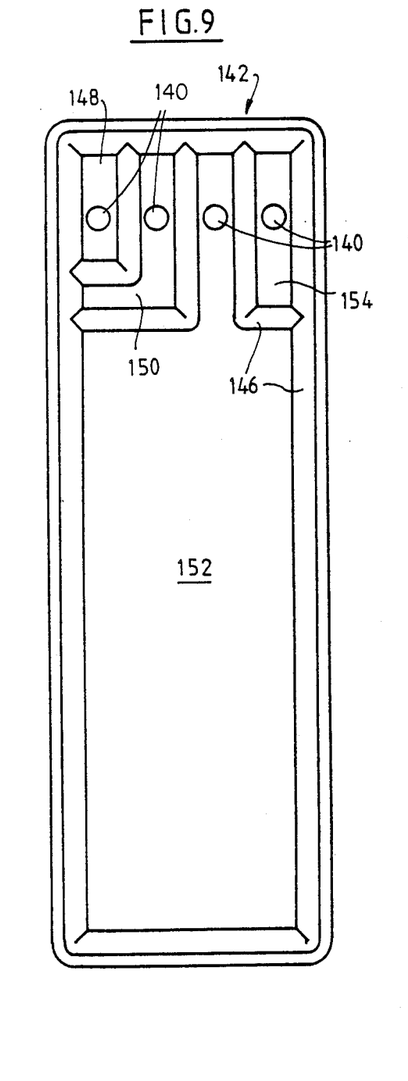
FIGS. 9 and 10 are plan views of the gaskets covering the face of the fixed distributor element which is associated with the second moving elements connected to the moving members.

The gasket 142 is made of elastomer or like material, as is the gasket 100 and likewise includes projecting sealing ribs or lips 146 which delimit four chambers 148, 150, 152, and 154, each of which has one of the abovementioned holes 140 opening out therein.

Figure 10:
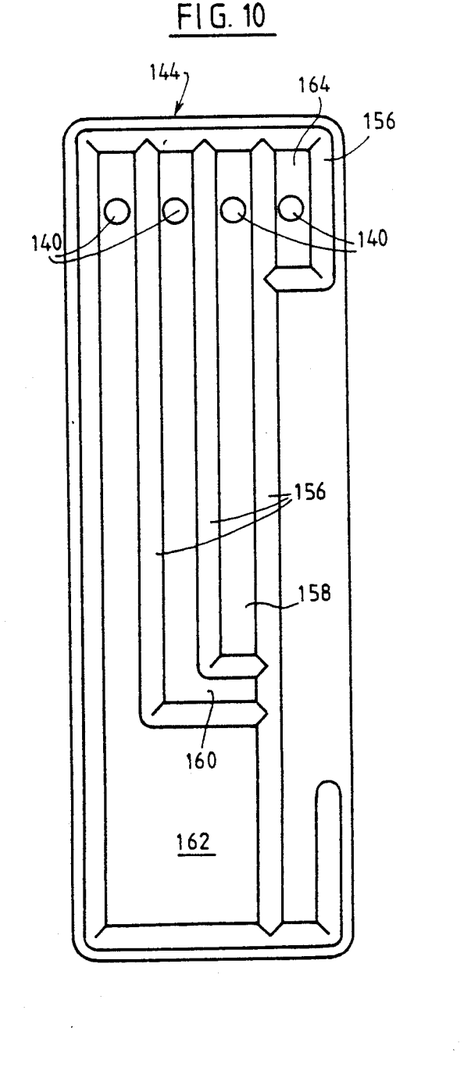

Likewise, the sealing gasket 144 is made of elastomer or similar material and includes sealing ribs or lips 156 which delimit four chambers 158, 160, 162 and 164, each of which have one of the holes 140 opening out therein.

Figure 11:
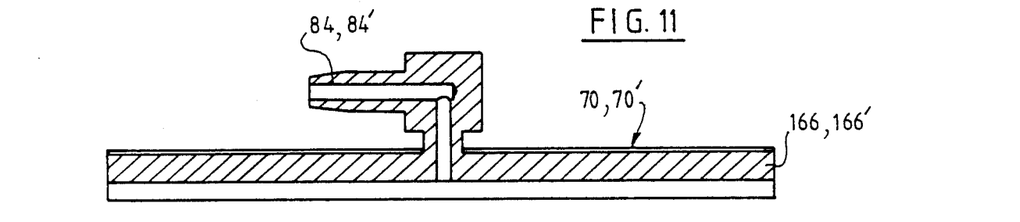
FIG. 11 is a longitudinal section through a second moving element.
Figure 12:
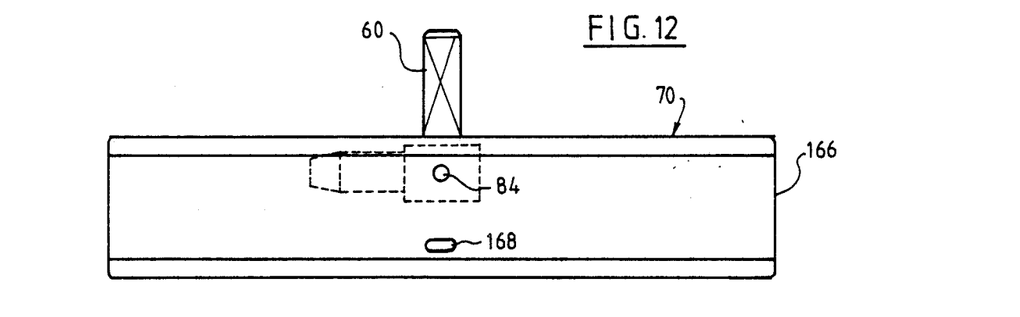
FIGS. 12 and 13 show the inside faces of the second moving elements of the distributor shown in FIGS. 6 and 7.
Figure 13:
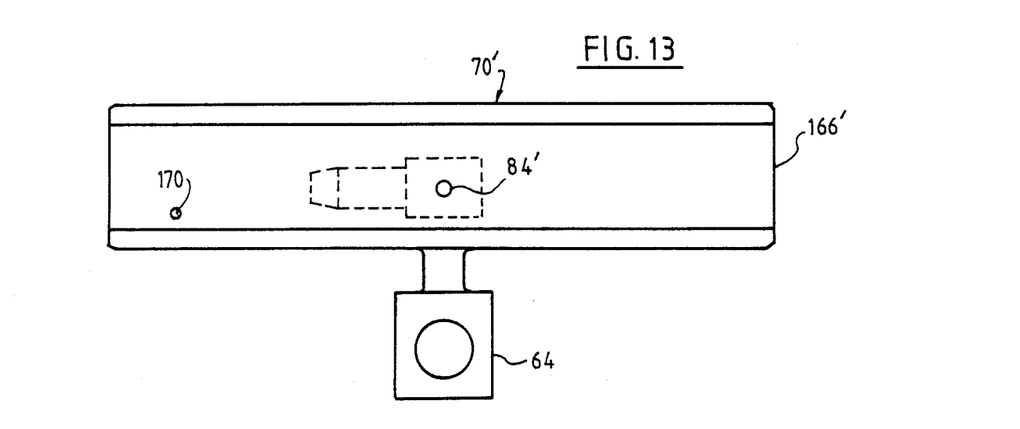

The second moving elements 70 and 70′ which move in sealed manner over the gaskets 142 and 144 are shown in greater detail in FIGS. 11 to 13.

Each of the second moving elements 70 and 70′ comprises an elongated channel-section plate 166, 166′ having a fluid passage 84, 84′ opening out therein for connection to the feed orifice of the corresponding actuator 46, 48, and is fitted with a laterally-projecting finger 60, 64 enabling the moving element to be connected to the piston rod of the corresponding actuator.

The second moving element 70 which is associated with the flap V1 has its fluid passage 84 opening out in the inside face of the plate 166 at a distance from the flanges thereof such that the passage 84 moves longitudinally from chamber 148 to chamber 150 and then to chamber 152 as delimited by the gasket 142 when the moving element 70 is displaced relative to the fixed element 86. The inside face of the plate 166 also includes a groove 168 which does not pass therethrough, but which is located level with the opening of the passage 84 and which extends over a certain distance close to the other side flange of the plate 166 to allow said groove to establish a connection between the chambers 152 and 154 by bridging a sealing rib or lip 146 when the moving element 70 is in a predetermined position relative to the fixed element 86.

The second moving element 70′ associated with the flap V2 has a hole 170 passing therethrough close to one of its longitudinal ends and to one of the side flanges of the plate 166′ in such a manner as to enable the hole 170 to open out into the chamber 164 formed by the gasket 144 when said moving element 70′ is in a predetermined position relative to the fixed element 86. The fluid passage 84′ connected to the feed orifice of the corresponding actuator opens out in the inside face of the plate 166′ in such a position as to be put into communication successively with the chambers 158, 160, and 162 when the moving element 70′ is displaced relative to the fixed element 86 of the distributor.

The operation of the distributor is now described with reference to FIGS. 14 to 16.

Figure 14:
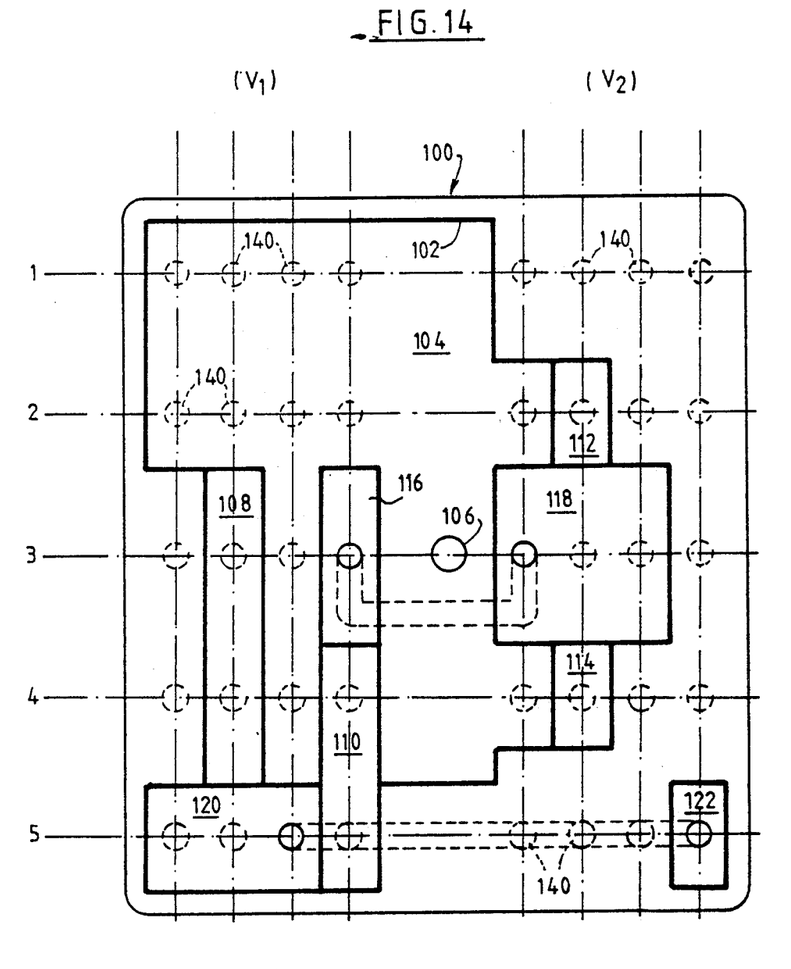
FIGS. 14 to 16 are diagrammatic views showing the operation of a fluid distributor in accordance with the invention.

FIG. 14 shows the gasket 100 of the first moving element which is connected to the control means in simplified form, with its sealing ribs or lips 102 being represented by heavy lines delimiting the various chambers. FIG. 14 also shows the various possible positions of the holes 140 through the fixed element 86 of the distributor when the first moving element 88 is in each of the five predetermined positions 1, 2, 3, 4, and 5 which it can take up relative to the fixed element 86 in response to displacement of the control means.

Figure 15:
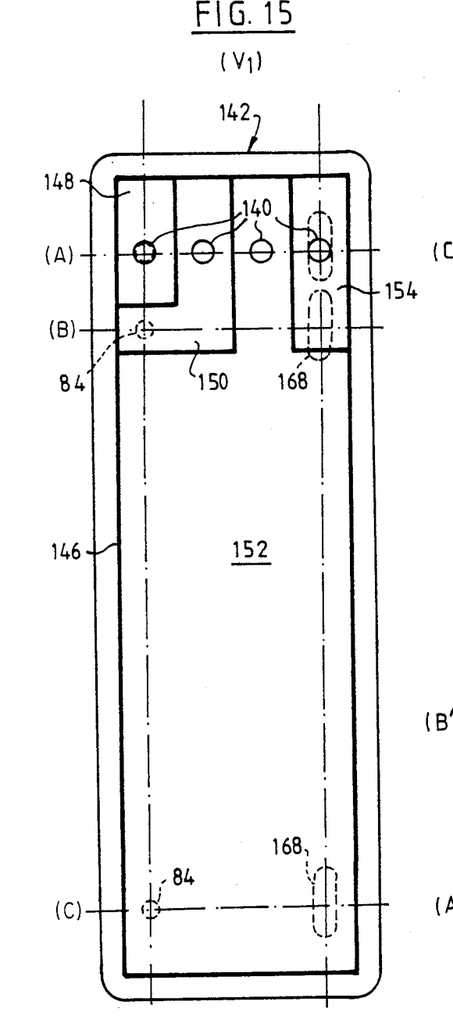
Figure 16:
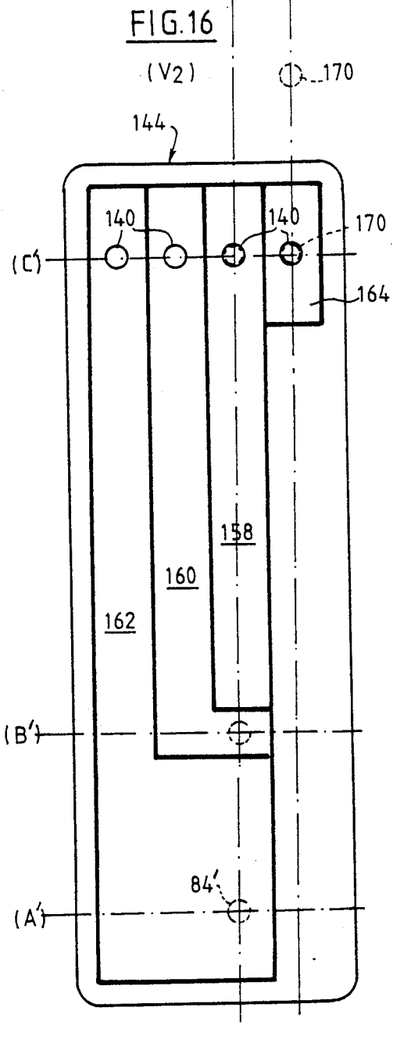

FIGS. 15 and 16 are similar simplified diagrams showing the gaskets 142 and 144 respectively, and also showing the relative positions of the fluid passages 84 and 84′, of the groove 168 and of the hole 170 of said second moving elements 70 and 70′ as the associated flaps V1 and V2 move through their positions A, B, C, and A′, B′, C′.

When the control means is in its state or position No. 1 as shown in FIG. 2, the moving element 88 which is associated therewith in the distributor is in such a position relative to the fixed element 86 of the distributor that the holes 140 through the fixed element are aligned transversely on line No. 1 of FIG. 14. As a result the four holes 140 which also pass through the gasket 142 which is associated with the moving element 70 all open out into the chamber 104 which is permanently connected to the source of reduced pressure by the hole 106 and the tubular finger 40 of the first moving element 88. Consequently, the four chambers 148, 150, 152, and 154 formed between the gasket 142 and the second moving element 70 are all connected to the source of reduced pressure and the associated actuator 46 is fed with reduced pressure via the fluid passage 84 which must open out into a chamber being fed with reduced pressure regardless of the position of the second moving element 70 (and thus the flap V1) relative to the fixed element 86 of the distributor. Since the actuator 46 is fed with reduced pressure, the piston rod 50 is completely retracted therein, the flap V1 is brought to its position A, and the second moving element 70 of the distributor which is associated with said flap is in such a position relative to the fixed element 86 that the opening of the passage 84 and the groove 168 reply on transverse line A in FIG. 15.

As can be seen in the right-hand half of FIG. 14, all four holes 140 which also pass through the gasket 144 associated with the other flap V2 open out into the gasket 100 outside any of the chambers which are delimited by sealing ribs or lips 102, i.e. they open out directly to the atmosphere. As a result all four chambers 158, 160, 162, and 164 formed between the gasket 144 and the second moving element 70' associated with the flap V2 are connected to the exhaust with the result that the actuator 48 must be connected to the exhaust and the piston rod 52 is fully extended from the actuator 48 causing the flap V2 to be in its position A' as shown in FIG. 2. In this position the fluid passage 84' through the second moving element 70 opens out relative to the fixed gasket 144 on transverse line A' (see FIG. 16).

When the control means is brought or displaced to state No. 2, the holes 140 of the fixed element of the distributor open out relative to the gasket 100 along line No. 2 in FIG. 14. It can be seen that the four holes 140 which also pass through the gasket 142 (left hand side of FIG. 14) still open out into the chamber 104 which is connected to the source of reduced pressure, thus having no effect on the position of the associated flap V1 relative to the No. 1 state.

However, it can be seen on the right hand side of FIG. 14 that one of the holes 140 which also pass through the gasket 144 now opens out into the chamber 104 which is permanently connected to the source of reduced pressure, and another of the holes 140 opens out into an isolated chamber 112, with the other two holes still opening out to the atmosphere. As a result, with reference to FIG. 16, it can be seen that the chamber 162 is supplied with reduced pressure while the chamber 160 is isolated, and the chamber 158 remains connected to the exhaust. Consequently, the flap V2 is brought to and held in its position B' as shown in FIG. 2. While in this position, the second moving element 70' of the distributor which is associated with the flap V2 occupies a position relative to the gasket 144 such that the fluid passage 84' opens out on line B' in FIG. 16, i.e. into the chamber 160 which is isolated from the source of reduced pressure and from the atmosphere.

When the control means is in its No. 3 state or position, the holes 140 passing through the fixed element of the distributor open out relative to the gasket 100 along transverse line No. 3 of FIG. 14.

The holes 140 which also pass through the gasket 142 open out in order: firstly to the atmosphere, secondly to an isolated chamber 108, thirdly to the chamber 104 which is permanently connected to the source of reduced pressure, and fourthly to the chamber 116 which is connected to the chamber 118. With reference to FIG. 15, it can be seen that the chamber 148 is connected to the exhaust, the chamber 150 is isolated and the chamber 152 is connected to the source of reduced pressure. Under these conditions the flap V1 is brought to and held in its position B as shown in FIG. 2.

The passage 84 through the moving element 70 opens out relative to the gasket 142 on transverse line B of FIG. 15. In this position, the groove 168 is astride chambers 152 and 154 and interconnects the chambers. As a result the chamber 154 is connected by chamber 152 to the chamber 104 which is itself permanently connected to the source of reduced pressure. The chamber 154 is thus connected to the source of reduced pressure and, since it is in communication with the chamber 116 via one of the holes 140, the chambers 116 and 118 are also connected to the source of reduced pressure, so long as the flap V1 is in its position B as shown in FIG. 2.

When the control means are in state or position No. 3, the first three holes 140 which also pass through the gasket 144 open out into the chamber 118 while the fourth hole 140 (furthest to the right in FIG. 14) opens out to the atmosphere (i.e. to the exhaust). As a result, the three chambers 158, 160, 162 are connected to the source of reduced pressure via the chambers 118, 116, 154, 152, and 104 when the flap V1 is in its position B (with the groove 168 putting chamber 154 and 152 into communication), and they are isolated from the source of reduced pressure and from the exhaust when the flap V1 is in a position other than its position B or a position very close thereto. Thus, the actuator 48 associated with the flap V2 is fed with reduced pressure in state No. 3 of the control means only if the flap V1 is in its position B, and otherwise it is isolated from the source of reduced pressure or from the exhaust so long as the flap V1 is in some other position. When the actuator 48 is connected to the source of reduced pressure, the piston rod 52 is retracted and the flap V2 is brought to its position C' and the second element 70' is brought to a position such that its passage 84' opens out on the line C' of FIG. 16.

When the control means is in its state or position No. 4, the holes 140 passing through the fixed element 86 of the distributor are located along line No. 4 of FIG. 14 relative to the gasket 100. The left-hand four holes 140 which also pass through the gasket 142 open out in order: to the atmosphere, to chamber 108, to chamber 104, and to isolated chamber 110. These connections are the same as for state No. 3 of the control means and flap V1 therefore does not change position.

The right-hand four holes 140 which also pass through the gasket 144 open out in order: into the chamber 104 which is connected to the source of reduced pressure, into isolated chamber 114, and the third and fourth holes open out to the atmosphere. As a result the chamber 162 formed between the gasket 144 and the second moving element 70' of the distributor is fed with reduced pressure, the chamber 160 is isolated, and the chambers 158 and 164 are connected to the exhaust. Consequently, the actuator 48 is fed with reduced pressure if the fluid passage 84' opens out into the chamber 162, is isolated from the source of reduced pressure and from the exhaust if it opens out into the chamber 160, and is connected to the exhaust if it opens out into the chamber 158. The flap V2 is thus brought to and held in its position B' of FIG. 2, in which position the fluid passage 84' through the second moving element 70' of the distributor opens out relative to the gasket 144 into the chamber 160 on the line B' of FIG. 16.

When the control means is brought to its state or position No. 5, the holes 140 passing through the fixed element 86 of the distributor open out relative to the gasket 100 along line No. 5 of FIG. 14.

The holes 140 which also pass through the gasket 142 open out into chamber 120 except for the last hole 140 which opens out into the isolated chamber 110. Consequently, the three chambers 148, 150, and 152 formed between the gasket 142 and the second moving element 70 of the distributor communicate with the chamber 120 which is itself connected to the chamber 122. The chamber 154 is connected to the chamber 110 which is isolated.

The four holes 140 passing through the fixed element 86 and also through the gasket 144 open out in a zone of the gasket 100 lying outside the sealing lips or ribs 102 and thus connected to the atmosphere, except for the fourth or rightmost hole 140 which opens out into the chamber 122. Consequently, the chambers 162, 160, and 158 formed between the gasket 144 and the second moving element 70' of the distributor are connected to the exhaust. The actuator 48 is thus connected to the exhaust by the fluid passage 84' which necessarily opens out into one of the chambers 158, 160, and 162 and the flap V2 is brought to its position A' of FIG. 2, for which the fluid passage 84' opens out relative to the gasket 144 on line A' of FIG. 16. In this position, the hole 170 passing through the second moving element 70' opens out into the chamber 164 and thus connects it to the atmosphere. The chamber 122 and thus 120 are thus connected to the atmosphere via the chamber 164 and hole 170 so that the three chambers 148, 150, and 152 formed between the gasket 142 and the moving element 70 of the distributor are connected to the atmosphere. The actuator 46 is thus connected to the exhaust and the flap V1 is displaced to position C of FIG. 2.

So long as the flap V2 is not in its position A' of FIG. 2, the hole 170 passing through the second moving element 70' of the distributor does not open out into chamber 164, and this chamber is thus isolated from the source of reduced pressure and from the exhaust, causing the chamber 120 and 122 to be likewise isolated. In other words, the chambers 120 and 122 are either connected to the exhaust because the flap V2 is in its position A' or very close thereto, or else they are isolated from the source of reduced pressure and from the exhaust when the flap V2 is in some other position.

As a result when the control means is in its state or position No. 5, chambers 148, 150 and 152, and thus actuator 46 are isolated from the source of reduced pressure and from the exhaust so long as the flap V2 is not in its position A' or very close thereto, so the flap V1 is not moved and remains in the position it was in previously until the flap V2 is in its position A' or very close thereto, in which case the above-mentioned chambers 148, 150, and 153, and thus the actuator 46 are connected to the exhaust and the flap V1 is brought to its position C.

The apparatus in accordance with the invention makes it possible, as has just been described, to control the order in which the flaps move from one position to another whenever that may be necessary to prevent the flaps from jamming each other.

The gaskets 142 and 144 define, in conjunction with the corresponding second moving element 70 or 70' of the distributor, three chambers 148, 150, 152 or 158, 160, 162 which serve to feed the associated actuator 46 or 48, together with a fourth chamber 154 or 164 which served to detect the presence of the flap V1 or V2 associated with the moving element 70 or 70' in a specific position. Naturally there could be several chambers 154 or 164 on each gasket 142 or 144, thereby enabling the presence of the associated flap to be detected in a plurality of predetermined positions.

Similarly, the gasket 100 associated with the control means defines, in conjunction with the fixed element of the distributor, two series of chambers 116–118 and 120–122 which enable the actuator associated with a flap to be connected to the source of reduced pressure or to the exhaust only if the other flap is in a specific position. Similarly, the numbers of such series of chambers 116–118 and 120–122 could be increased.

The apparatus in accordance with the invention which has been described in an application for controlling two flaps is applicable without difficulty to controlling a larger number of flaps.

It is possible to bring the displacement of one flap not only under the control of the presence or absence of a single other flap in a predetermined position, but also on the presence or absence of two other flaps in respective predetermined positions. To do this, the gasket 100 should be supplied with groups of three permanently interconnected chambers instead of the groups of two interconnected chambers as shown.

I claim:

1. Apparatus for controlling plural moving members such as flaps in an installation for heating and ventilating or for air conditioning the cabin of a motor vehicle, the apparatus including single acting type actuators having piston rods connected to said moving members for displacement thereof, a pressurized fluid distributor connected firstly to feed orifices of said actuators and secondly to a source of fluid under pressure and to an exhaust, and distributor control means capable of occupying a plurality of fixed states or positions which correspond to predetermined positions of the moving members; the improvement comprising fluid servo control means for bringing the displacement of at least one moving member under the control of the displacement of at least one other moving member, said servo control means detecting the presence or absence of a moving member in a predetermined position and controlling displacement of another moving member as a function of said detected presence or absence, said servo control means comprising chambers formed in the distributor, with each chamber being firstly suitable for connection to the feed orifice of the actuator for displacing a specific moving member when said servo control means is in a predetermined state or position and to be isolated therefrom when the servo control means is in another position or state, and secondly for being connected to the exhaust or to the source of fluid under pressure by means associated with another moving member solely when said other moving member is in a predetermined position, and to be isolated therefrom when said other moving member is in some other position.

2. Apparatus according to claim 1, wherein the fluid flow servo control means are integrated in the distributor for fluid under pressure.

3. Apparatus according to claim 1, wherein the chambers are formed within the distributor between a fixed element thereof and a first moving element thereof, said first moving element being connected to the distributor control means and being displaceable thereby to occupy predetermined positions relative to the fixed element.

4. Apparatus according to claim 3, wherein said chambers are permanently interconnected in pairs, with one of the chambers of such an interconnected pair being associated with one of the moving members to detect whether it is present or absent in a predetermined position, and with the other chamber of said pair being associated with another moving member to enable or to inhibit its displacement towards a given position.

5. Apparatus according to claim 4, wherein the distributor includes a plurality of second moving elements associated with respective moving members and connected to the corresponding member or to its actuator piston rod, said second moving elements forming chambers with the fixed element and being displaceable relative to the fixed element through predetermined positions, said fixed element including fluid passages establishing communication between the chambers formed with the first moving element and the chambers formed with the second moving elements as a function of the positions of said second moving elements relative to the fixed element.

6. Apparatus according to claim 5, wherein the chambers formed between the fixed element and the first moving element include at least: one chamber connected to the source of fluid under pressure, one chamber connected to the exhaust, one chamber which is isolated from the source of fluid under pressure and from the exhaust, and said above-mentioned chambers constituting a portion of the servo control means and suitable for being connected to the source of fluid under pressure or to the exhaust and for being isolated therefrom as a function of the positions of the moving members.

7. Apparatus according to claim 6, wherein the chambers formed between the fixed element and each of the moving second elements comprise a number of chambers equal to the number of positions which a moving second element may occupy relative to the fixed element, and at least one additional chamber for detecting the presence of the moving second element in a predetermined position relative to the fixed element.

8. Apparatus according to claim 7, wherein said additional chamber is connected to the source of fluid under pressure or to the exhaust by a fluid passage through the moving first element when the moving second element is in said predetermined position, and for being isolated when the moving second element is in some other position.

9. Apparatus according to claim 5, wherein each moving second element is connected to the feed orifice of the associated actuator via a fluid duct having one end which opens out into one or other of the chambers formed between said moving second element and the fixed element.

10. Apparatus according to claim 5, wherein the fixed element includes as many fluid passages per second moving element as there are chambers between the fixed element and said second moving element each of said chambers being permanently connected by one of said fluid passages to a chamber formed between the fixed element and the first moving element which is associated with the distributor control means.

11. Apparatus according to claim 5, wherein the fixed element of the distributor comprises a plate disposed in sealed relationship between the first moving element and the second moving elements, with the fluid passages through the fixed element comprising holes passing through said plate.

12. Apparatus according to claim 5, wherein the face of the fixed element which faces the second moving elements is covered by at least one gasket having sealing ribs or lips applied against a plane face of each moving second element in order to delimit said chambers.

13. Apparatus according to claim 5, wherein the first moving element of the distributor comprises a plate having a face facing the fixed element, said face being covered with a gasket having sealing ribs or lips which are applied against the fixed element to delimit said chambers.

* * * * *